US008069723B2

(12) United States Patent
Wells et al.

(10) Patent No.: US 8,069,723 B2
(45) Date of Patent: Dec. 6, 2011

(54) METHOD OF MODIFYING A FLUID LEVEL SENSING ASSEMBLY BY REPLACING A MECHANICAL FLOAT

(76) Inventors: Richard D. Wells, Birmingham, MI (US); Jerome F. Rock, Grosse Pointe Park, MI (US)

(*) Notice: Subject to any disclaimer, the term of this patent is extended or adjusted under 35 U.S.C. 154(b) by 0 days.

(21) Appl. No.: 12/709,075

(22) Filed: Feb. 19, 2010

(65) Prior Publication Data
US 2010/0139780 A1 Jun. 10, 2010

Related U.S. Application Data

(62) Division of application No. 11/952,638, filed on Dec. 7, 2007, now abandoned.

(51) Int. Cl.
*G01F 23/00* (2006.01)
(52) U.S. Cl. ...................................... 73/290 R
(58) Field of Classification Search .............. 73/304 C
See application file for complete search history.

(56) References Cited

U.S. PATENT DOCUMENTS

| | | | |
|---|---|---|---|
| 1,745,095 A * | 1/1930 | Hill | 73/297 |
| 2,385,161 A | 9/1945 | Pinkerton | |
| 2,904,017 A | 9/1959 | Anderson et al. | |
| 3,190,268 A | 6/1965 | MacDonald et al. | |
| 4,242,989 A | 1/1981 | Chamberlain | |
| 4,263,587 A | 4/1981 | John | |
| 4,457,266 A | 7/1984 | La Spisa | |
| 4,465,088 A | 8/1984 | Vosper | |
| 4,491,146 A | 1/1985 | Sveds | |
| 4,574,328 A | 3/1986 | Maier | |
| 4,662,390 A * | 5/1987 | Hawkins | 137/392 |
| 5,012,429 A | 4/1991 | Lantz | |
| 5,111,691 A | 5/1992 | John et al. | |
| 5,224,445 A | 7/1993 | Gilbert, Sr. | |
| 5,739,504 A | 4/1998 | Lyons et al. | |

(Continued)

FOREIGN PATENT DOCUMENTS

JP 10185108 7/1998

(Continued)

OTHER PUBLICATIONS

Written Opinion of the International Searching Authority for application No. PCT/US2008/085129 dated Jun. 26, 2009.

(Continued)

*Primary Examiner* — Hezron E Williams
*Assistant Examiner* — Nathaniel Kolb
(74) *Attorney, Agent, or Firm* — Reising Ethington PC

(57) ABSTRACT

A level sensing assembly senses the level of a fluid in a tank. The tank includes a fluid port that is disposed below the level of the fluid and an air port disposed above the level of fluid. The level sensing assembly includes a lower port in fluid communication with the fluid port of the tank. An upper port is in fluid communication with the lower port of the tank. A measuring vessel is disposed between the lower and upper ports and is in fluid communication therebetween. The measuring vessel includes an auxiliary port disposed adjacent the upper port. The level sensing assembly also includes a level sensor extending down through the auxiliary port into the measuring vessel to measure the level of the fluid in the measuring vessel and the level of the fluid in the tank.

7 Claims, 5 Drawing Sheets

U.S. PATENT DOCUMENTS

| | | |
|---|---|---|
| 6,390,027 B1 | 5/2002 | Lyons et al. |
| 6,520,122 B2 | 2/2003 | Kemp et al. |
| 6,588,272 B2 * | 7/2003 | Mulrooney et al. ............. 73/324 |
| 6,666,086 B2 | 12/2003 | Colman et al. |
| 6,964,278 B2 | 11/2005 | Tschanz |
| 6,978,741 B2 | 12/2005 | Kemp et al. |
| 7,093,611 B2 | 8/2006 | Murray et al. |
| 7,249,573 B2 | 7/2007 | Kemp et al. |
| 2006/0124078 A1 | 6/2006 | Merwin |

FOREIGN PATENT DOCUMENTS

| | | |
|---|---|---|
| JP | 20030004204 | 8/2004 |

OTHER PUBLICATIONS

International Search Report for application No. PCT/US2008/085129 dated Jun. 26, 2009.

* cited by examiner

METHOD OF MODIFYING A FLUID LEVEL SENSING ASSEMBLY BY REPLACING A MECHANICAL FLOAT

This patent application is a divisional of a U.S. patent application having application Ser. No. 11/952,638, which is hereby incorporated by reference.

BACKGROUND ART

1. Field of the Invention

The invention relates to level sensing assemblies for measuring the level of a fluid in a vessel. More particularly, the invention relates to modifying a float level sensing assembly to a non-float level sensing assembly to measure the level of water in a vessel.

2. Description of the Related Art

There are many situations that require an accurate reading of a fluid in a tank or vessel. While many of these tanks are pressurized, fluid level measurements are also important in non-pressurized tanks. Accurate fluid level measurements are important in order to maintain a system operating as it is designed. Fluid level measurements are important because they can be used to warn an operator of a system that the fluid in a particular tank is about to empty. In many situations, the system that requires the fluid in the tank may be damaged if the level of the fluid in the tank drops below a certain level.

One example of a system that requires a monitoring of a fluid level within a tank is a boiler system. Steam boilers have feed water controls that are responsible for the level of fluid, e.g., water, in the boiler. As the boiler boils the water to create steam, a source of water must supply water to the boiler. If the boiler runs out of water, the boiler will be damaged or destroyed because the steel that creates the boiler cannot transfer the thermal energy it receives away from itself at a rate sufficient to avoid damage thereto. In other words, the boiler requires a sufficient supply of water therewithin.

Referring to FIG. 1, an embodiment of a prior art fluid level sensor is generally indicated at 10. The fluid level sensor 10 is in fluid communication with a tank 12 that has a fluid 14 therein. The fluid 14 defines a fluid level 16.

The fluid level sensor 10 includes a measuring vessel 18 with a water port 20 and a steam port 22 disposed on either end thereof. A fluid level 24, shown in phantom, represents the fluid level 16 in the tank 12.

The fluid level sensor 10 includes three separate and independent systems for measuring the fluid level 24 in the measuring vessel 18. The fluid level sensor 10 has a mechanical float mechanism, generally shown at 26 that includes a float (not shown) which extends into the measuring vessel 18 to float on the fluid level 24. The fluid level sensor 10 also includes a glass gauge 28 that allows an operator the ability to visually identify the location of the fluid level 24 within the measuring vessel 18 without having to open the measuring vessel 18. The third mechanism for identifying the fluid level 24 in the measuring vessel 18 includes a set of tricocks 30 that may be opened to identify what flows out of each of the set of tricocks 30. The measuring vessel 18 includes an auxiliary port 32, which receives a plug 34 therein.

Referring to FIG. 2, the measuring vessel 18 of the prior art is shown prior to installation. The measuring vessel 18 is shipped to a site for installation with the mechanical float mechanism 26 secured thereto (although not shown in FIG. 2 for simplicity). Inserted into the auxiliary port 32 is a temporary plug 36 and a positioning cylinder 38 disposed therewithin. The positioning cylinder 38 is coaxial with the temporary plug 36 and extends down into the interior 40 of the measuring vessel 18. The positioning cylinder 18 is typically fabricated of cardboard. The positioning cylinder 38 is used exclusively for maintaining the mechanical float in a particular position during shipment of the measuring vessel 18 to the site of installation. The positioning cylinder 38 and temporary plug 36 are removed upon reaching the site of installation and the auxiliary port 32 is immediately plugged with the plug 34 for continued operation of the measuring vessel 18 through its life.

The problem with the three mechanisms for identifying the fluid level 24 within the measuring vessel 18 is that they are very insensitive and, when translating the mechanical measurement to an electrical signal, inaccurate methods for measuring a fluid level such as the fluid level 24. If an operator is not present to view the glass gauge 28, or the glass gauge 28 is dirty or corroded such that the fluid level is not visible therein, the method of using the set of tricocks 30 or the mechanical float mechanism 26 reduces the fluid level sensing assembly 10 to one that is very cyclical with the fluid level either being too high or too low and rarely being at an optimal level for operation. This increases the costs of energy as more energy is consumed when the level of fluid in the vessel 12 cycles through such a large range of fluid levels.

SUMMARY OF THE INVENTION

A level sensing assembly senses the level of a fluid in a tank. The tank includes a fluid port that is disposed below the level of the fluid and an air port disposed above the level of fluid. The level sensing assembly includes a lower port in fluid communication with the fluid port of the tank. An upper port is in fluid communication with the lower port of the tank. A measuring vessel is disposed between the lower and upper ports and is in fluid communication therebetween. The measuring vessel includes an auxiliary port disposed adjacent the upper port. The level sensing assembly also includes a level sensor extending down through the auxiliary port into the measuring vessel to measure the level of the fluid in the measuring vessel and the level of the fluid in the tank.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
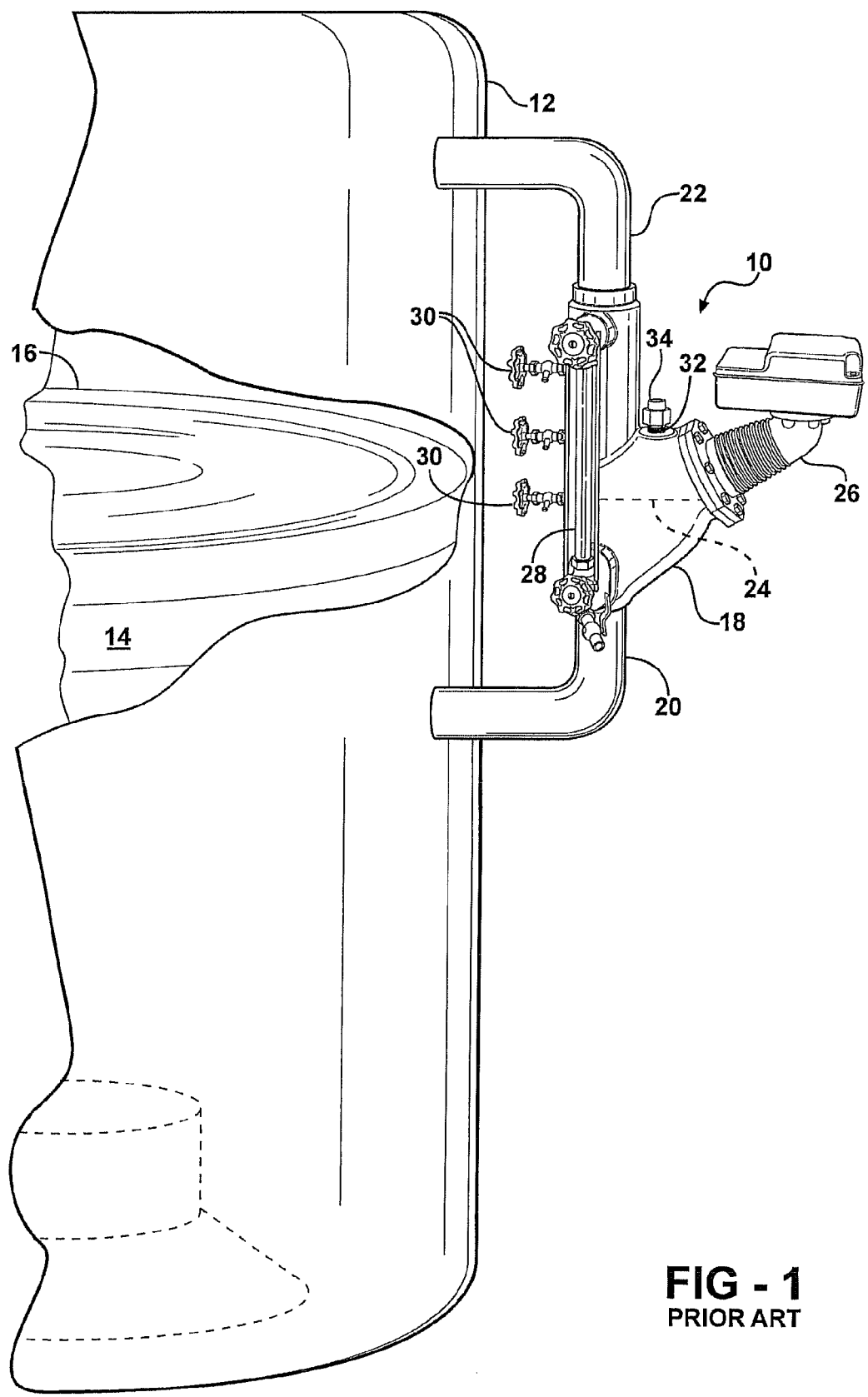
FIG. 1 is a perspective view, partially cut away, of a fluid level sensing assembly of the prior art.
Figure 2:
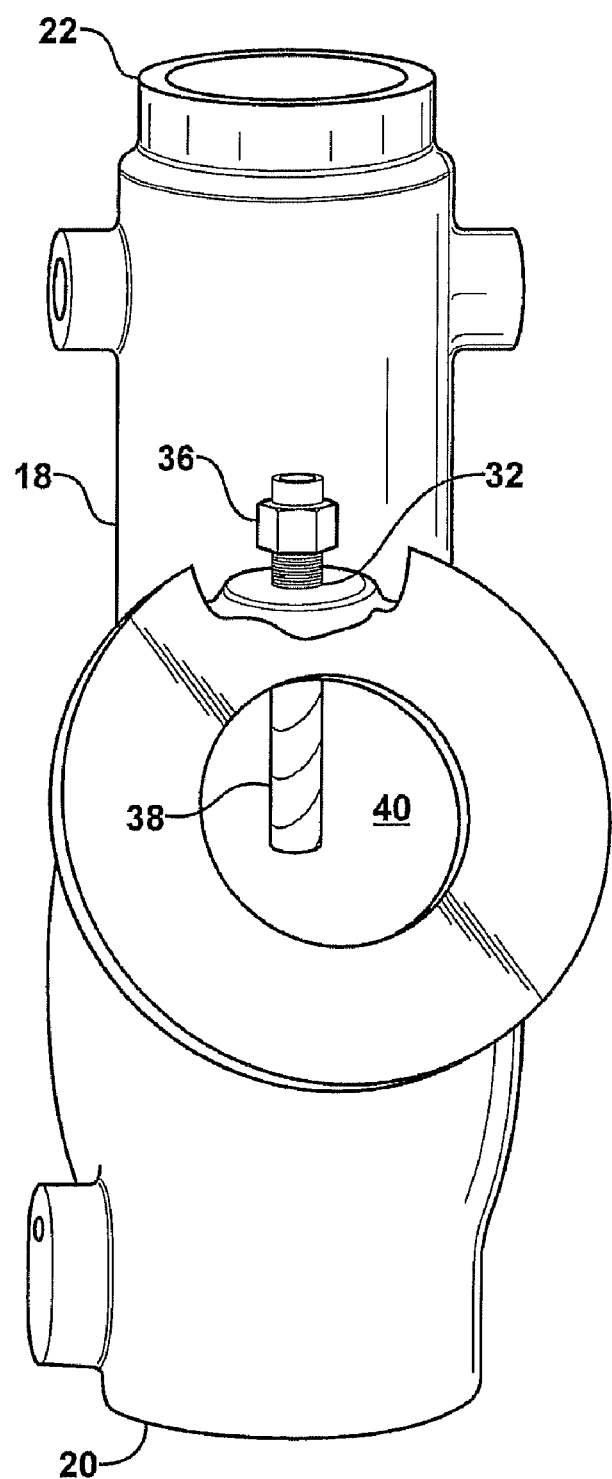
FIG. 2 is a perspective view of a measuring vessel of the prior art prior to installation.
Figure 3:
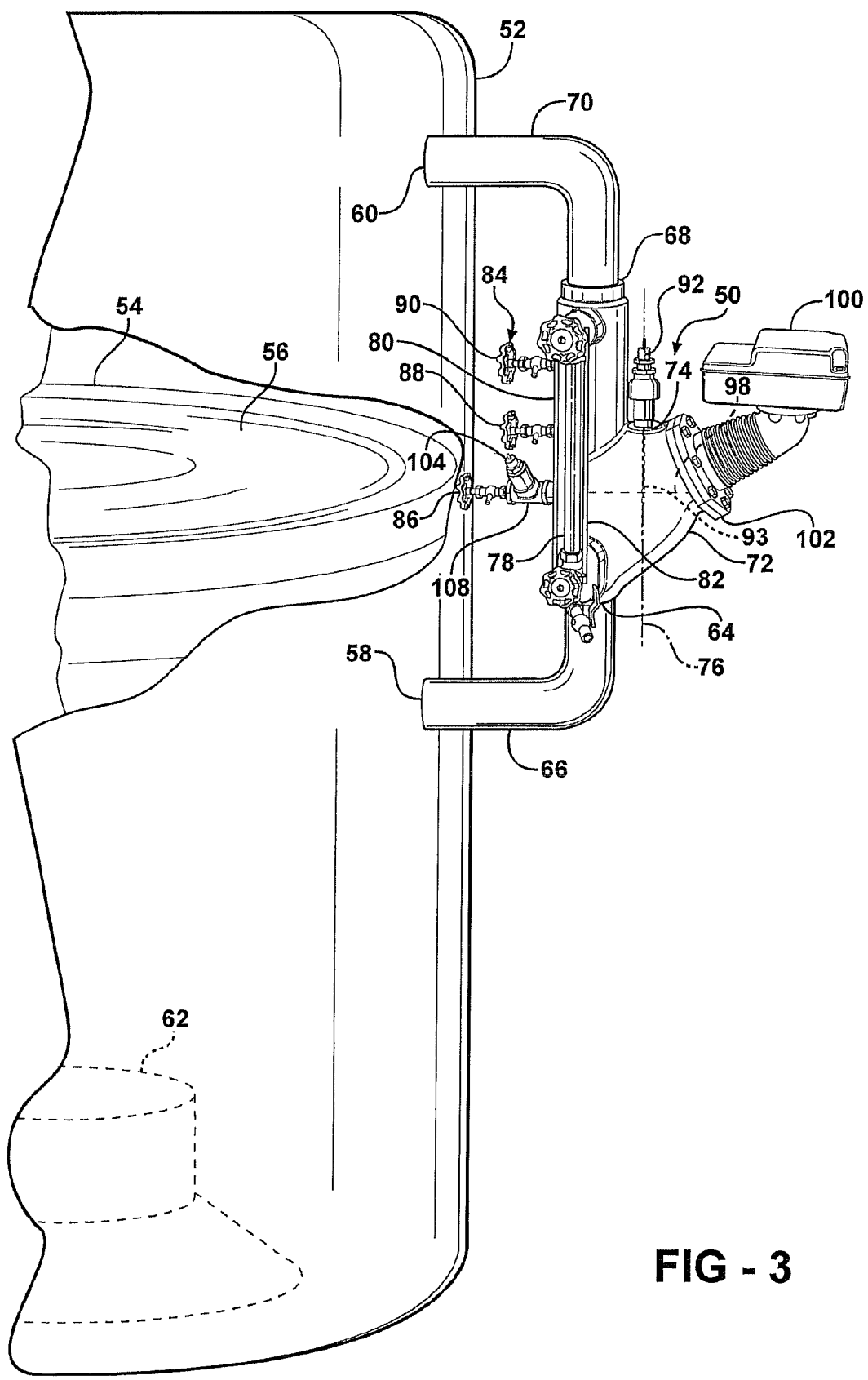
FIG. 3 is a perspective view partially cut away of one embodiment of the invention.

Referring to FIG. 3, one embodiment of the inventive level sensing assembly is generally indicated at 50. The level sensing assembly 50 is operatively secured to a tank or vessel 52 and senses a level 54 of a fluid 56 in the tank 52. The tank 52 is equipped with a fluid port 58 and an air port 60. The fluid port 58 creates an opening in the tank 52 below the level 54 of the fluid 56. The air port 60 creates an opening in the tank 52 above which the level 54 that the fluid should be. The fluid 58 and air 60 ports are shown in the upper half of the tank 52. It should be appreciated by those skilled in the art that the respective ports 58, 60 may be positioned anywhere along the tank 52 so long as the fluid port 58 has a portion of the fluid 56 flowing therethrough and the air port 60 is disposed above the position in which the level 54 is located.

The tank 52 includes a heating element 62, graphically represented as an indentation in the bottom portion of the tank 52. The heating element 62 may house a heating element or receive thermal energy from a source to heat up the fluid 56 inside the tank 52 to produce steam for any desired purpose. It should be appreciated by those skilled in the art that while the inventive level sensing assembly 50 is shown attached to a boiler tank 52, the level sensing assembly 50 may be used with any type of tank 52, boiler or otherwise, mobile or immobile, pressurized or non-pressurized. In addition, the tank 52 may be used on a vehicle or in a craft so long as the fluid 58 and air 60 ports maintain their position relative to the level 54 of the fluid 56 stored within the tank 52.

As discussed with the prior art, the level sensing assembly 50 includes a lower port 64 that is in fluid communication with the fluid port 58 of the tank 52. A pipe 66 extends between the fluid port 58 and the lower port 64. Likewise, the level sensing assembly 50 includes an upper port 68 which is in fluid communication with the air port 60 of the tank 52. A second pipe 70 extends between the upper port 68 and the air port 60.

The level sensing assembly 50 also includes a measuring vessel 72 that is disposed between the lower 64 and upper 68. The measuring vessel 72 provides fluid communication between the upper 68 and lower 64 ports. The measuring vessel 72 also includes an auxiliary port 74 disposed adjacent to the upper port 68. The auxiliary port 74 is threaded and extends through the measuring vessel 72 in an orientation that creates an auxiliary axis 76 which is perpendicular to a plane defined by the level 54 of the fluid 56. In the embodiment shown, the auxiliary axis 76 created by the auxiliary port 74 is parallel to axes which may define the upper port 68 and lower port 64.

The measuring vessel 72 includes a glass gauge 78, which is protected by two metal rods 80, 82. The glass gauge 78 allows an operator of the level sensing assembly 50 to view the level 54 of the fluid 56. The glass gauge 78 is discussed in greater detail above with reference to the prior art.

In addition, the level sensing assembly 50 also includes a set of tricocks, generally shown at 84, that also allow an operator to physically determine the level 54 of the fluid 56.

The level sensing assembly 50 includes a set of tricocks generally shown at 84, that also allow an operator to physically determine the level 54 of the fluid 56 in the measuring vessel 72 which corresponds directly to the level 54 of the fluid 56 in the tank 52. The set of tricocks define a lower 68, middle 80, and upper 90 tricocks and may be used if the operator were to not be able to use the glass gauge 78. The operator may open the upper tricock 90 to determine whether the fluid level was that high. If it were not, the operator may open the middle tricock 80 or the lower tricock 86 to identify what flows therefrom.

The level sensing assembly 50 also includes a level sensor 92 that extends down through the auxiliary port 74 along the auxiliary axis 76 into the measuring vessel 72 to measure the level 54 of the fluid 56 in the measuring vessel 72 and the level of the fluid 56 in the tank 52. The level sensor 92 defines a sensor body 93 that is linear. More specifically, the sensor body 93 extends through a straight line. Because the measuring vessel 72 is in fluid communication with the tank 52, a portion of the fluid 56 exists in an interior chamber 94 (best seen in FIG. 4) whereby the portion of fluid 96 disposed therein has a level 98 which is the same level as the level 54 of the fluid 56 and the tank 52. By measuring the level 98 of the fluid 96 inside the measuring vessel 72, the level sensor 92 can accurately and precisely determine the level 98 and, hence, the level 54 in the tank 52. The level sensor 92 measures the level 98 along its entire length. It can, therefore, identify an infinite number of levels 98 at which the fluid in the measuring vessel 72 is at. The ability to provide an infinite number of outputs allows the control circuit to control the valve feeding fluid into the tank 52 to open variably to match the rate at which the fluid is leaving the tank 52. This leads to a more even control of the tank 52 and less energy consumption when the tank 52 is a boiler. As opposed to an on/off sensor, that only changes its output when the fluid with the measuring vessel 72 is no longer in contact with the sensor, the level sensor 92 produces a signal regardless of the level 54 of the fluid 56 in the tank 52. And the signal changes with the level 56 of the fluid 54 in the tank 52.

In one embodiment, the level sensor 92 is a capacitive sensor that is electronically connected to a control circuit (not shown) that provides immediate feedback as to the level 54 in the tank 52. This allows the level sensing assembly 50 to minimize the swings (peaks and valleys) between level minimums and level maximums to optimize the energy consumption of the system by maintaining a level 54 as close to an optimal level as possible. The capacitive sensor 92 used as the level sensor 92 is capable of an output that allows greater control than a standard on/off switch. Flow rates can be adjusted based on the level 54 of the fluid 56 in the tank 52. This allows the flow of water into the tank 52 to match more precisely the flow of water out of the tank 52 in the form of steam, avoiding energy absorbing swings in the amounts of water being fed into the tank 52. This is because the level sensor 92 measures the level 54 in the tank 52 and not merely when the level 54 reaches a particular low level, at which point the valve to fill the tank 52 is opened fully allowing a huge amount of cold water into the tank 52, which in turn, requires a greater amount of energy to bring the cold water up to boiling temperature. In the preferred embodiment, the valve (not shown) is opened an amount proportional to the amount of water needed to fill the tank 52 to the optimal level of operation. If the system is slowly having the liquid in the tank 52 exit the system, then the level sensor 92 will indicate such and the valve will not be opened fully. If, on the other hand, the tank 52 is emptying rapidly, the signals produced by the level sensor 92 will indicate such and the valve will be opened more fully. Therefore, the level sensor 92 assists in maintaining the level 54 in the tank 52 as close to steady state as possible.

The level sensor 92 may be any type of sensor that is capable of extending down into the interior chamber 94 and into the fluid 96 that is stored therein. Other types of level sensors 92 include, but are not limited to, resistive and magneto-resistive sensors.

Figure 4:
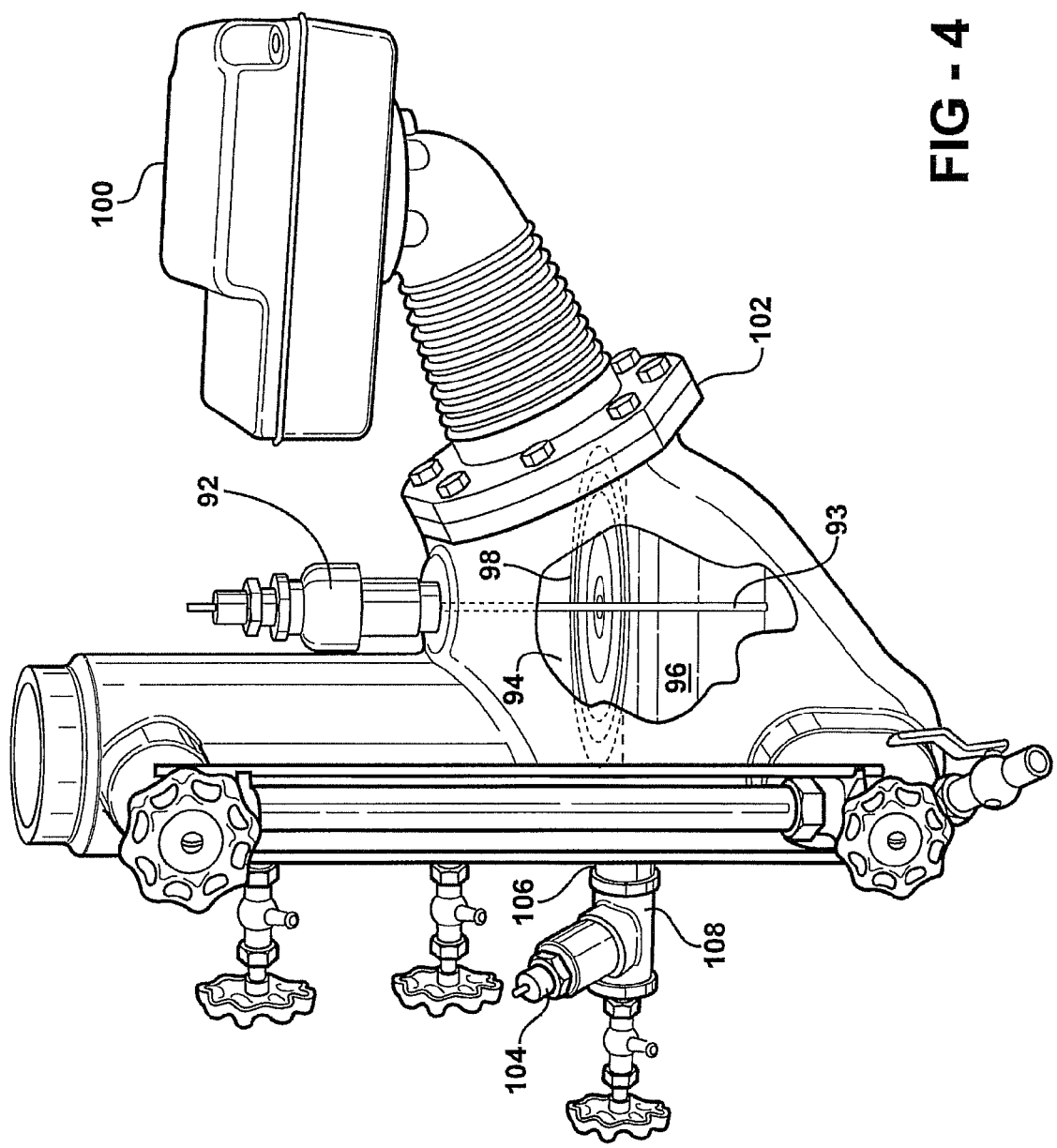
FIG. 4 is a perspective view, partially cut away, of the measuring vessel shown in FIG. 3.

As with the prior art, a cover 100 for a mechanical float mechanism of the prior art is shown in FIGS. 3 and 4. By adding the level sensor 92 to the auxiliary port 74, much of the mechanical float mechanism that was housed within the cover 100 is removed because it is no longer necessary. The cover 100 is, however, typically replaced because it is rated as a cover 100 that may close the measuring vessel 72 at the float port 102. If it were desired, the cover 100 could be replaced with a flat plate, so long as the flat plate were proven to be of a quality of metal or material that is acceptable for the rules and regulations that govern the safety parameters of these types of vessels. These exist primarily for boilers and pressurized tanks.

As an additional safety feature for the measuring vessel 72, a shut off sensor 104 is included to ensure that the measuring vessel 72 not fail. The shut off sensor 104 is in fluid communication with the fluid 96 inside the measuring vessel 72 and will produce a signal which will shut down any boiler or heating element or pressure generating device that is used in the system to which the tank 52 is attached. The shut off sensor 104 is connected to the measuring vessel 72 at a location disposed adjacent the lower tricock 86. More specifically, the lower tricock 86 is removed from the measuring vessel and the shut off sensor 104 is secured to the port associated with the lower tricock 86 using a T-shaped pipe 108. Once the shut off sensor 104 is secured to the measuring vessel 72, the lower tricock 86 is secured to an end of the shut off sensor 104. Therefore, if the fluid 96 within the measuring valve 72 drops to a level below that which is associated with the lower tricock 86, the shut off sensor 104 will provide a signal to shut down the system associated with the tank 52 to prevent any damage to the tank 52 or the system with which the tank 52 is connected.

The configuration of the level sensing assembly 50 may occur at the point in which the measuring vessel 72 is fabricated or, in the alternative, may be configured at a later time after the measuring vessel 72 has been in operation. In other words, the level sensing assembly 50 may be configured as an original manufacturing piece of equipment. Alternatively, the level sensing assembly 50 may be a retrofit to an existing sensing assembly that may include a mechanical float mechanism 26.

In the situation when the level sensing assembly 50 is original equipment, the level sensor 92 is secured within the auxiliary port 74 along the auxiliary axis 76 at the time of manufacture. In addition, the shut off sensor 104 is secured to the port to which a lower tricock 86 would be secured prior to the securing of the lower tricock 86.

In the case of a "retrofit," the plug 34 that is used to seal the auxiliary port 32 for the fluid level sensing assembly 10 of the prior art is removed. This sometimes requires much effort as the auxiliary port 32 could have been sealed for decades. Once that is removed, the auxiliary port 74 may be used to receive the level sensor 92 therein. The float mechanism, not shown, that is housed within the cover 100 and which also extends down into the interior chamber 94 of the measuring vessel 72 is then removed. The cover 100 could be replaced. Alternatively, an approved plate of material could replace the cover 100 as the cover is no longer necessary.

In addition, the lower tricock 86 is removed from the measuring vessel 74. A pipe 108 having a "T" configuration is secured thereto. The shut off sensor 104 is then secured to the pipe 108. The lower tricock 86 is then secured to a second opening in the pipe 108 that holds the shut off sensor 104 in place. In the preferred embodiment, the pipe 108, tricock port 106 and lower tricock 86 are all pipe threaded to allow each of these parts to threadingly engage their respective or adjacent parts. After the shut off sensor 104 and the level sensor 92 are in place, the level sensing assembly 50 is sealed by sealing the auxiliary port 74 and the tricock port 106.

In either method of assembly, either the original equipment or retrofit scenario, the level sensor 92 is oriented vertically such that it extends into the fluid 96 within the measuring vessel 72 perpendicularly to a plane created by the level 98 thereof. This avoids any orientation problems associated with possibly having a sensor extend into the measuring vessel 72 at an angle.

Figure 5:
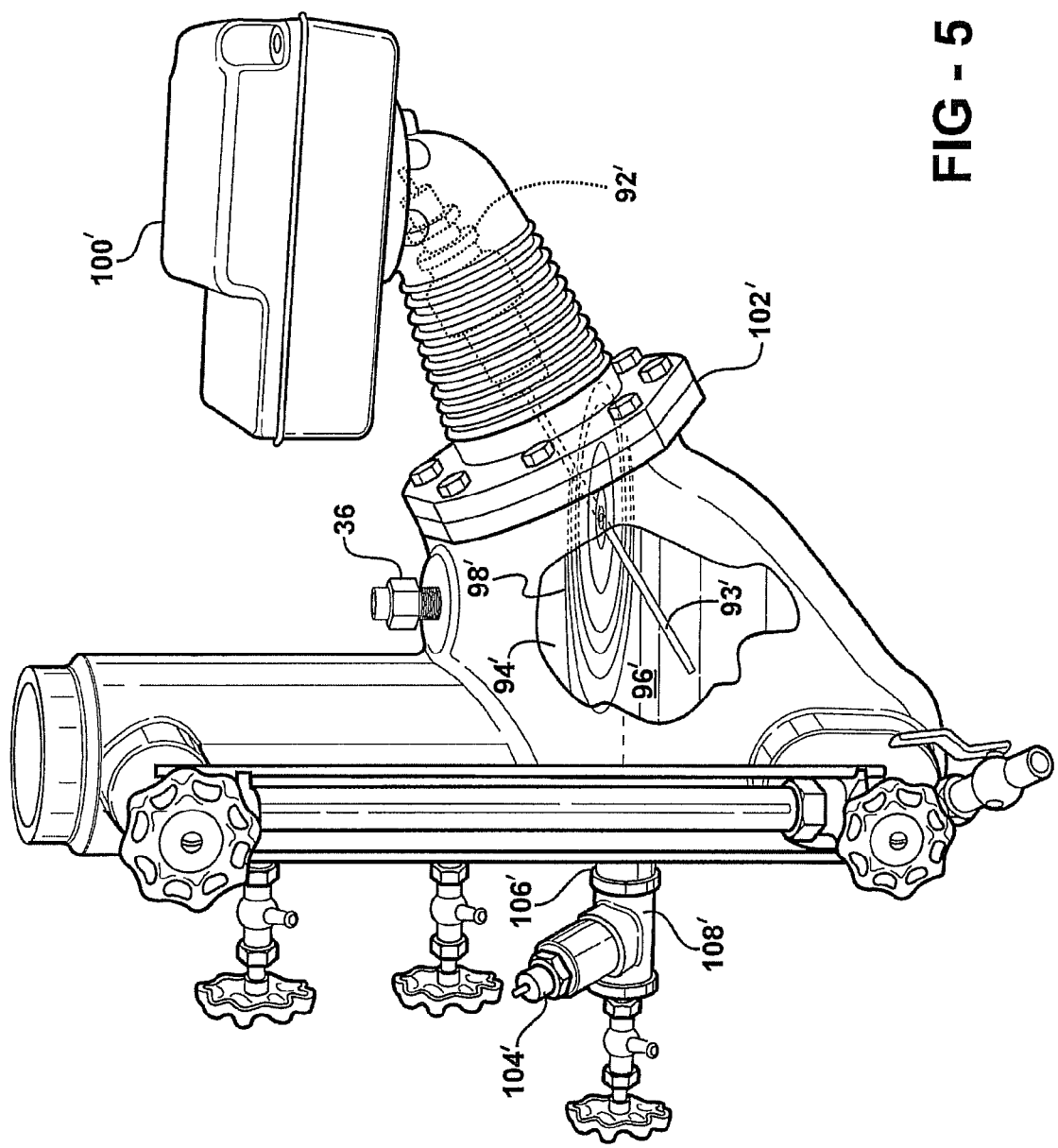
FIG. 5 is a perspective view, partially cut away, of an alternative embodiment of the measuring vessel configuration shown in FIG. 3.

Referring to FIG. 5, wherein like primed numerals represent similar elements to those of the preferred embodiment, the level sensor 92' is mounted within the cover 100' used to house the float mechanism. As with the preferred embodiment, the float mechanism is removed. The level sensor 92' extends down through a sensor access port 102' and will operate in a manner identical to the preferred embodiment with the only difference being the signal generation and how it is treated by the control circuitry to match the level 54' in the tank 52' based on the location of the level 94' of the fluid that is covering the level sensor 52'.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for modifying a level sensing assembly having a measuring vessel with a lower port, an upper port, an auxiliary port, a set of tricock ports and a mechanical float port having a mechanical float extending therethrough into the measuring vessel, wherein the method includes the use of a level sensor having an elongated body with a defined length, the method comprising the steps of:
   unsealing the mechanical float port;
   removing the mechanical float therefrom;
   sealing the mechanical float port after the step of removing the mechanical float therefrom;
   opening the auxiliary port;
   inserting a level sensor into the auxiliary port; and
   sealing the level sensor within the auxiliary port.

2. A method as set forth in claim 1 including the step of orienting the level sensor vertically within the measuring vessel.

3. A method as set forth in claim 2 including the step of orienting the level sensor vertically within the measuring vessel along the entire length of the level sensor.

4. A method as set forth in claim 3 including the step of removing a tricock from one of the set of tricock ports.

5. A method as set forth in claim 4 including the step of securing a shut-off sensor to the one of the set of tricock ports.

6. A method as set forth in claim 5 including the step of securing the tricock to the shut-off sensor.

7. A method as set forth in claim 6 wherein the step of removing a tricock includes removing the tricock from a lower most one of the set of tricock ports.

* * * * *